United States Patent [19]

Okitsu et al.

[11] 4,196,703

[45] Apr. 8, 1980

[54] INTAKE SYSTEM FOR INTERNAL COMBUSTION ENGINES

[75] Inventors: Kingo Okitsu, Hiroshima; Toshimitsu Tanaka, Yamaguchi; Kazuhiro Yasumoto; Akiyoshi Kamimoto, both of Hiroshima, all of Japan

[73] Assignee: Toyo Kogyo Co., Ltd., Hiroshima, Japan

[21] Appl. No.: 840,913

[22] Filed: Oct. 11, 1977

[30] Foreign Application Priority Data

| Oct. 9, 1976 | [JP] | Japan | 51-136099[U] |
| Dec. 27, 1976 | [JP] | Japan | 51-175858[U] |
| Dec. 27, 1976 | [JP] | Japan | 51-175859[U] |
| Jan. 24, 1977 | [JP] | Japan | 52-7659[U] |

[51] Int. Cl.$^2$ ............................................. F02B 19/10
[52] U.S. Cl. ............................ 123/75 B; 123/188 M; 123/188 S
[58] Field of Search ............. 123/75 B, 188 M, 188 S, 123/141

[56] References Cited

U.S. PATENT DOCUMENTS

| T903,020 | 10/1972 | Cook et al. | 123/188 M |
| 3,408,992 | 11/1968 | Von Seggern et al. | 123/75 B |
| 3,678,905 | 7/1972 | Diehl | 123/188 M |
| 3,861,376 | 1/1975 | Ashley | 123/188 M |
| 3,911,873 | 10/1975 | Dave | 123/188 M |
| 3,926,158 | 12/1975 | Dolza | 123/32 K |
| 4,014,300 | 3/1977 | Klomp | 123/75 B |
| 4,050,422 | 9/1977 | Noguchi et al. | 123/188 S |

Primary Examiner—Ira S. Lazarus
Attorney, Agent, or Firm—Fleit & Jacobson

[57] ABSTRACT

Internal combustion engine having a primary and a secondary intake passage for each cylinder, the passages opening to the combustion chamber through a common intake port having an intake valve. A substantially radially extending partition plate is disposed at the intake port so as to separate the two passages one from the other when the intake valve is closed.

12 Claims, 14 Drawing Figures

INTAKE SYSTEM FOR INTERNAL COMBUSTION ENGINES

The present invention relates to internal combustion engines and more particularly intake systems therefor. More specifically, the present invention relates to engine intake systems having separated intake passages for light load and heavy load engine operations.

Hithertofore, proposals have already been made to provide an engine intake system which includes two separated intake passages for each engine cylinder, one for light load and the other for heavy load engine operations. The word "light load" as used herein may be construed as including medium load operating range.

In this type of engine intake system, the intake passage for heavy load operation which may be referred to as the secondary intake passage is connected through an intake port having an intake valve with the combustion chamber defined in the cylinder. The intake passage for light load operation which may be referred to as the primary intake passage is opened at the intake port in the area behind the intake valve. Under light and medium load operations as well as idling, the secondary intake port is shut-off so that combustible air-fuel mixtue is introduced into the engine combustion chamber only through the primary intake passage. Since the primary intake passage has a cross-sectional area which is small in relation to that of the secondary intake passage, the air-fuel mixture is introduced into the combustion chamber with an increased flow speed. Thus, it is possible to establish an improved atomization and vaporization of fuel. Further, under a heavy load operation, an increased amount of mixture is supplied additionally through the secondary intake passage to provide a desired engine output.

This type of intake system is believed as being advantageous over conventional engines having a single intake passage for each cylinder in respect of fuel atomization and vaporization. Further advantages can be attained in respect of combustion efficiency when the system is applied to a curved intake port configuration in which the intake port is so designed that the mixture is directed circumferentially of the cylinder, because the mixture swirl is intensified in the combustion chamber by this arrangement.

However, when this type of intake system is applied to multi-cylinder engines, a specific cylinder which is in the intake stroke at the instance under consideration may be supplied in light load operation with mixture even from the primary intake passages for other cylinders through mutually connected secondary intake passages because the primary and secondary passages are joined together at the area of the intake port behind the intake valve. As the result, the flow speed of the mixture through the primary intake passage may be decreased and the aforementioned advantages of the intake system may be diminished.

In order to eliminate the above problems, it has been proposed to provide means for separating the primary and secondary passages as completely as possible when the intake valve is closed, so that the engine cylinder is not supplied with mixture through any of the intake passages associated with other cylinders.

For example, reference is made to Japanese patent application No. Sho 46-44002 which has been filed on June 21, 1971 and disclosed for public inspection on Jan. 25, 1972 under the disclosure No. Sho 47-1504. In this application, there is disclosed a separation wall between the primary and the secondary intake passages, which terminates in the vicinity of the closed intake valve whereby the two passages are substantially separated one from the other by the separation wall and the back contour of the intake valve which is located very close to the adjacent end of the separation wall when the valve is closed. Similar constructions are also shown in the U.S. Pat. Nos. 3,408,992 and 3,418,981. However, the arrangements are disadvantageous in that it is extremely difficult to manufacture such separation wall with an adequate precision so that the gap between the intake valve and the separation wall can be substantially eliminated. Further, the separation wall is usually casted integrally with other parts of the cylinder head, the thickness of the wall undesirably decreases the cross-sectional area of the intake port.

In the U.S. Pat. No. 3,678,905, there is disclosed an engine intake system having a cylindrical separation tube disposed at the intake port. The interior of the tube is in communication with the secondary passage for heavy load operation while the primary passage is communicated with the area of the intake port around the tube. Thus, air-fuel mixture is supplied under light load operation through the whole periphery of the tube into the combustion chamber. Since the separation tube has an end terminating closely adjacent to or in engagement with the intake valve, desired separation can be achieved. However, the arrangement as taught by the patent is not effective to provide intense swirl of mixture in the combustion chamber.

The present invention has an object to provide an engine intake system including a primary intake passage for light load operation and a secondary intake passage for heavy load engine operation, which are separated for providing optimum performance.

Another object of the present invention is to provide an engine intake system which is easy to manufacture with a high precision.

A further object of the present invention is to provide an engine intake system including a primary and a secondary intake passage with means for separating the two passages at the intake port.

Still further object of the present invention is to provide an engine intake system including a primary and secondary intake passage with means for separating the two passages at the intake port, said means being able to be readily designed to provide an intense swirl of mixture.

According to the present invention, the above and other objects can be accomplished by an internal combustion engine comprising cylinder means having cylinder bore means and piston means disposed in said cylinder bore means for reciprocating movement to define combustion chamber means in said cylinder means, intake port means provided in said cylinder means to open to said combustion chamber means, intake valve means provided at the intake port means, intake passage means including first and second intake passage means which communicate with said intake port means, said first and second intake passage means being separated by separating wall means formed integrally with said cylinder means, means for closing said second passage means at least under light load engine operation, partition plate means provided in said intake port means to extend in chordwise direction of the intake passage means whereby an extension of said separating wall means is provided so as to substantially isolate the first and second intake passage means one from the other when the intake valve means is closed.

As conventional in the art, the cylinder means may be constituted by cylinder portions and cylinder heads attached thereto, and the intake port means may be formed in the cylinder heads. The partition plate means may then be inserted in manufacture into the intake port means from the side adjacent to the combustion chamber. For the purpose, the cylinder head may be formed at the intake port wall with grooves for receiving the side edges of the partition plate.

The partition plate serves to separate the first and second passages from each other at the intake port. A radially extending line may be defined by connecting the centroid of the cross-section of the first passage at the intake port with the center of the intake port. An extension of such radial line has a point of intersection with a projection of the cylinder bore and a tangential line of the cylinder bore projection at the point of intersection defines an angle with said radial line. According to a preferable aspect of the present invention, such angle is in the range between 50° and 80° in order to provide an intense swirl of air-fuel mixture in the combustion chamber.

The above and other objects and features of the present invention will become apparent from the following descriptions of preferred embodiments taking reference to the accompanying drawings in which.

Figure 1:
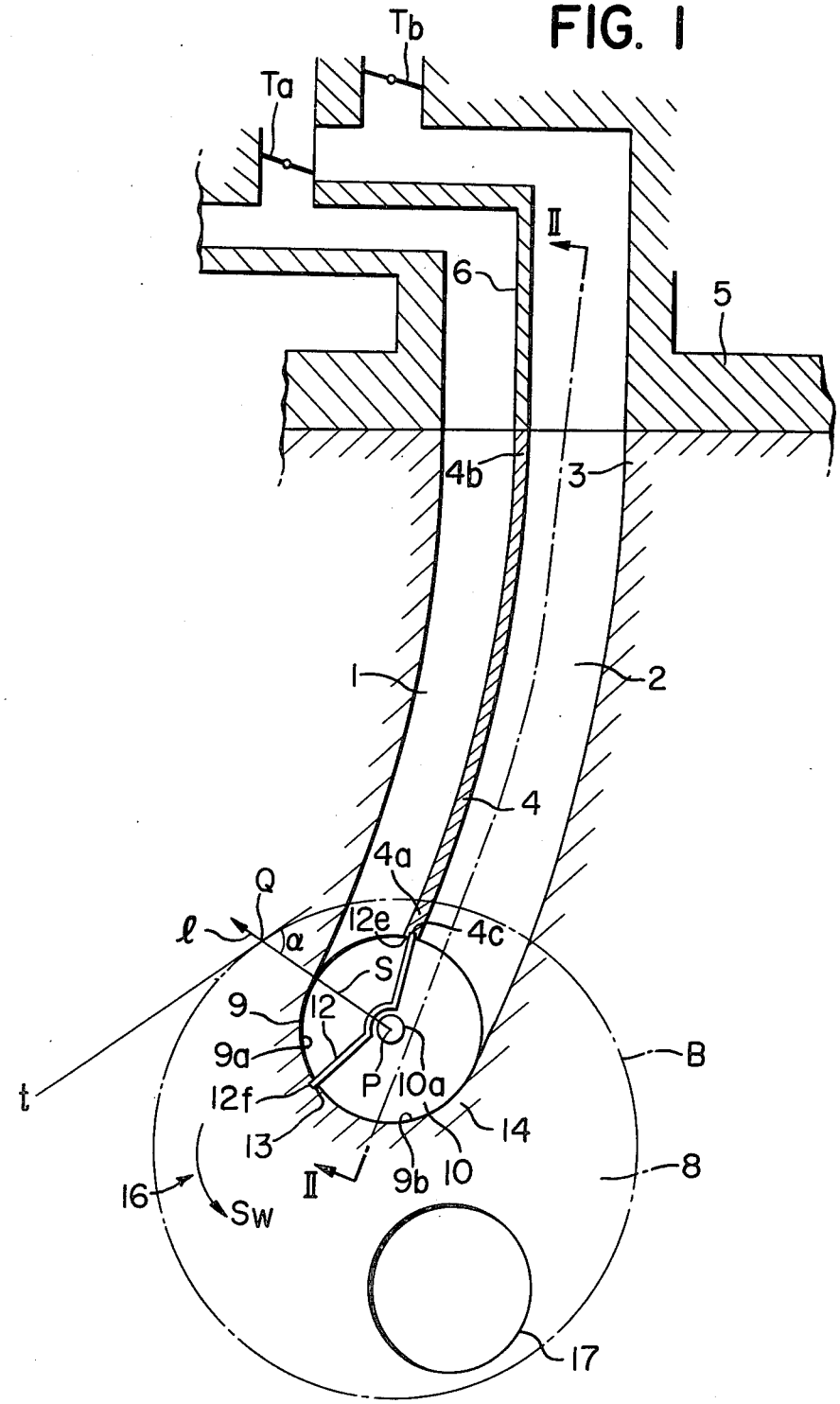
FIG. 1 is a sectional view specifically showing the intake passage arrangement embodying the feature of the present inention.
Figure 2:
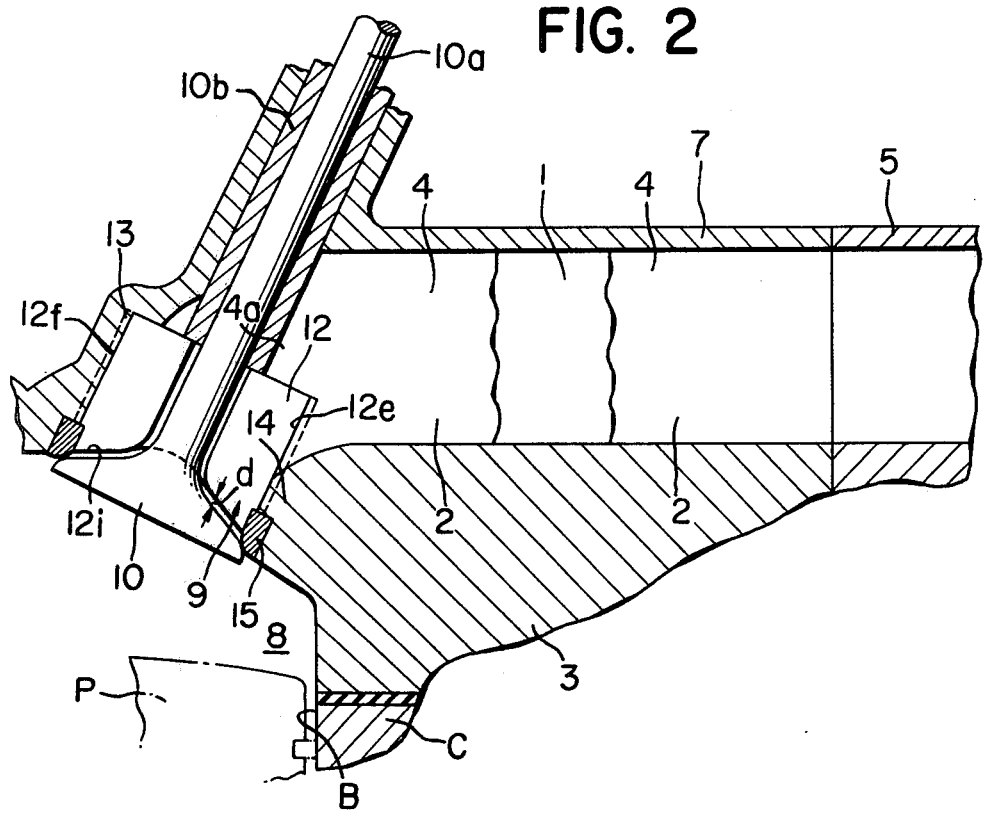
FIG. 2 is a sectional view taken substantially along the line II—II in FIG. 1.

Referring now to FIGS. 1 and 2, the engine shown therein includes a cylinder C having a cylinder bore B and a cylinder head 3 secured thereto. In the cylinder C, there is disposed a piston P which reciprocates and defines a combustion chamber 8 in the cylinder bore B. The cylinder head 3 is formed with an intake port 9 having a peripheral wall 14 and an exhaust port 17. At the intake port 9, the engine is provided with an intake valve 10 which has a valve stem 10a adapted to be guided by a valve stem guide 10b. The intake port 9 is provided with a valve seat ring 15 which is engaged with the intake valve 10 in the closed position of the valve.

The cylinder head 3 is formed with a primary intake passage 1 and a secondary intake passage 2 which communicates with the intake port 9. The primary and secondary passages 1 and 2 are isolated each from the other by means of a separating wall 4 which terminates at one end 4a in the vicinity of the intake port 9. At the other end 4b, the separating wall 4 is aligned and continued with a separating wall 6 formed in a manifold assembly 5 which is secured to the cylinder head 3.

Figure 3:
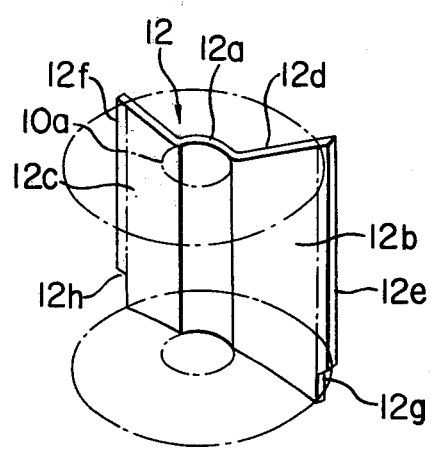
FIG. 3 is a perspective view showing one example of the partition plate in accordance with the present invention.

At the intake port 9, the cylinder head 3 is provided with a partition plate 12 which is attached thereto and forms a partition wall contiguous to the separating wall 4. As shown in FIG. 3, the partition plate 12 which may be press-formed from a steel plate has a central portion 12a of a semi-circular cross-section which is adapted to be placed around the valve stem 10a. The plate 12 further has a pair of wing portions 12b and 12c at the opposite sides having upper edges 12d and side edges 12e and 12f. The side edges 12e and 12f are received in grooves 4c and 13, respectively formed in the separating wall 4 and in the intake port 9 as shown in FIG. 1. The upper edges 12d of the plate 12 are in engagement with the end 4a of the separating wall 4. The side edges 12e and 12f of the plate 12 are cut off as shown by 12g and 12h at the ends opposite to the upper edges 12d so that it is accommodated to the valve seat ring 15. In manufacture, the plate 12 is thus mounted by inserting the side edges 12e an 12f into the grooves 4c and 13, respectively, and the valve seat ring 15 is then put in position, whereby the plate 12 is firmly held by the seat ring 15.

The partition plate 12 divides the intake port 9 into two portions 9a and 9b which communicate respectively with the primary and the secondary passages 1 and 2. The port portion 9a has a cross-sectional area which is small as compared with the cross-sectional area of the port portion 9b. For the purpose, the wing portions 12b and 12c make an angle of 120° to 150° therebetween in the specific embodiment. As shown in FIG. 1, the primary passage 1 has a throttle valve Ta in the manifold 5 and the secondary passage 2 has a throttle valve Tb. The throttle valve Tb in the secondary passage 2 is closed in light and medium load operations but opened only under a heavy load operation so that only the primary intake passage 1 is in service in operation under idling through medium load. Since the cross-sectional area of the port portion 9a is comparatively small, air-fuel mixture is introduced into the combustion chamber with a high speed.

Referring further to FIG. 1, the cross-section of the port portion 9a has a centroid S and the intake port 9 has a center P which may be the center of the intake valve stem 10a. An imaginary line 1 may be drawn through the points P and S and the line 1 intersects the projection of the cylinder bore B at the point Q. A tangential line t of the cylinder bore projection at the point Q makes an angle α with the line 1. According to the present invention, it is recommendable to determine the above angle α within the angle range of 50° through 80°. This angle range is found as being effective to produce an intense swirl of the air-fuel mixture in the combustion camber 8. More specifically, the air-fuel mixture through the port portion 9a is guided by the back contour of the intake valve 10 and then by the wall surface of the cylinder bore B to flow circumferentially of the cylinder producing an intense swirl.

Referring to FIG. 2, it will be noted that the partition plate 12 has a lower edge 12i which is complementary in configuration to the back contour of the intake valve 10. The lower edge 12i of the partition plate 12 is located very close to the intake valve 10 in its closed position. A recommendable gap between the lower edge 12i of the partition plate 12 and the intake valve 10 is between 0.5 and 1.0 mm in the closed position of the intake valve 10.

Figure 4:
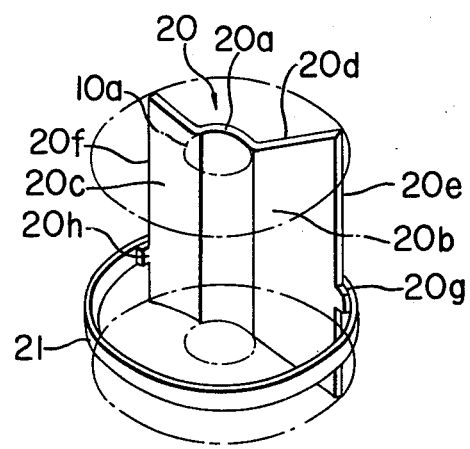
FIG. 4 is a perspective view showing another example of the partition plate.

FIG. 4 shows the partition plate in accordance with another embodiment of the present invention. In this embodiment, the partition plate 20 is also made of a steel plate and has a central portion 20a of a semi-circular cross-section which corresponds to the portion 12a in the previous embodiment. The plate 20 further includes a pair of wing portions 20b and 20c having upper edges 20d and side edges 20e and 20f. On the side edges 20e and 20f, the plate is formed with lug portions 20g and 20h to which a ring member 21 is attached by means of welding.

Figure 5:
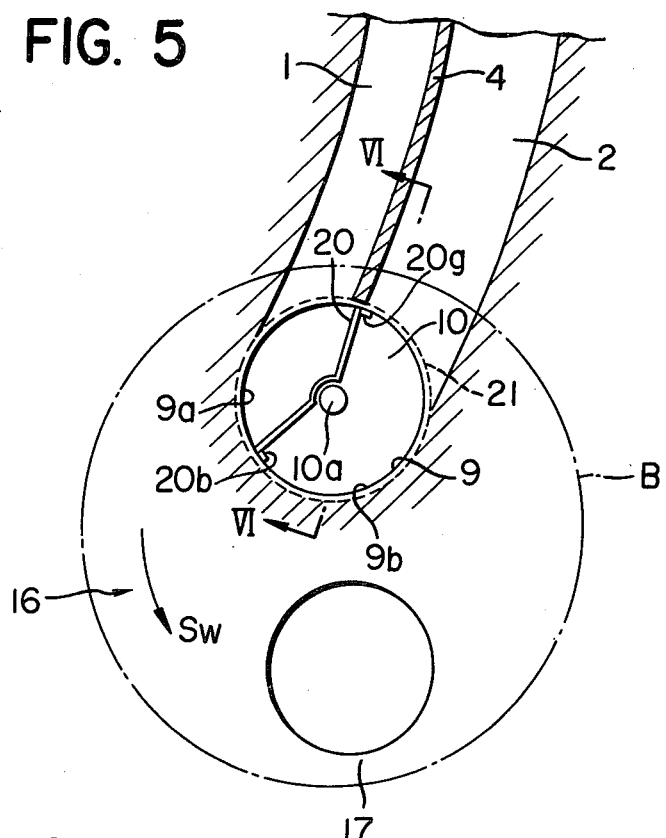
FIG. 5 is a sectional view similar to FIG. 1 but showing another embodiment of the present invention.
Figure 6:
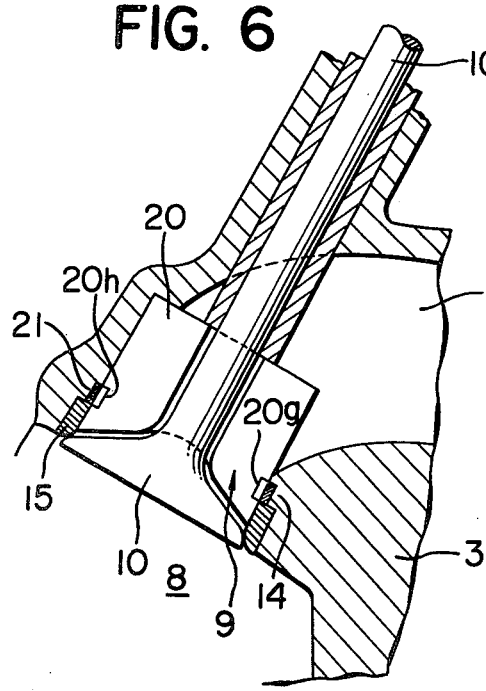
FIG. 6 is a sectional view taken substantially along the line VI—VI in FIG. 5.

FIGS. 5 and 6 show an example of intake port arrangement in which the partition plate 20 is installed. The plate 20 is positioned in place as in the previous embodiment but without providing any groove and firmly maintained at the ring member 21 by means of the valve seat ring 15.

Figure 7:
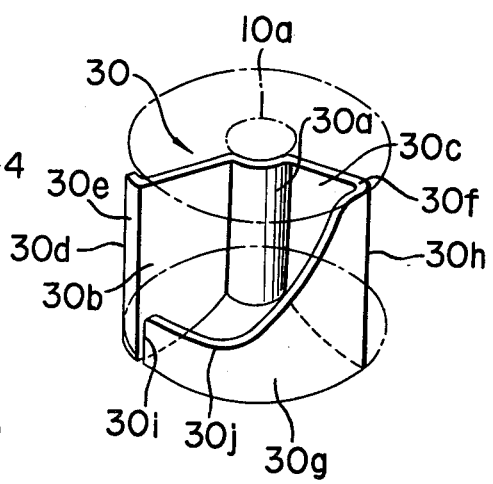
FIG. 7 is a perspective view of the partition plate employed in the embodiment shown in FIGS. 5 and 6.

Referring now to FIG. 7 which shows the partition plate in accordance with a further embodiment of the present invention, the partition plate 30 has a central portion 30a of semi-circular cross-section and a pair of wings 30b and 30c. The wing 30b has a side edge 30d which is bent outwards to form a lip portion 30e. The wing 30c has a side 30f which is continued to an arcuate wall 30g extending toward the wing 30b and terminating at a side edge 30i. The wall 30g is cut off at its upper portion to provide an oblique upper edge 30j.

Figure 8:
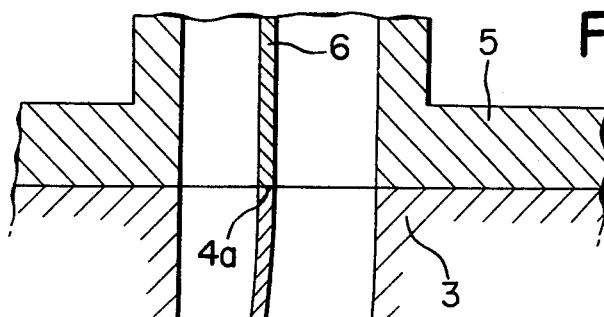
FIG. 8 is a sectional view similar to FIGS. 1 and 5 but showing a further embodiment of the present invention.
Figure 9:
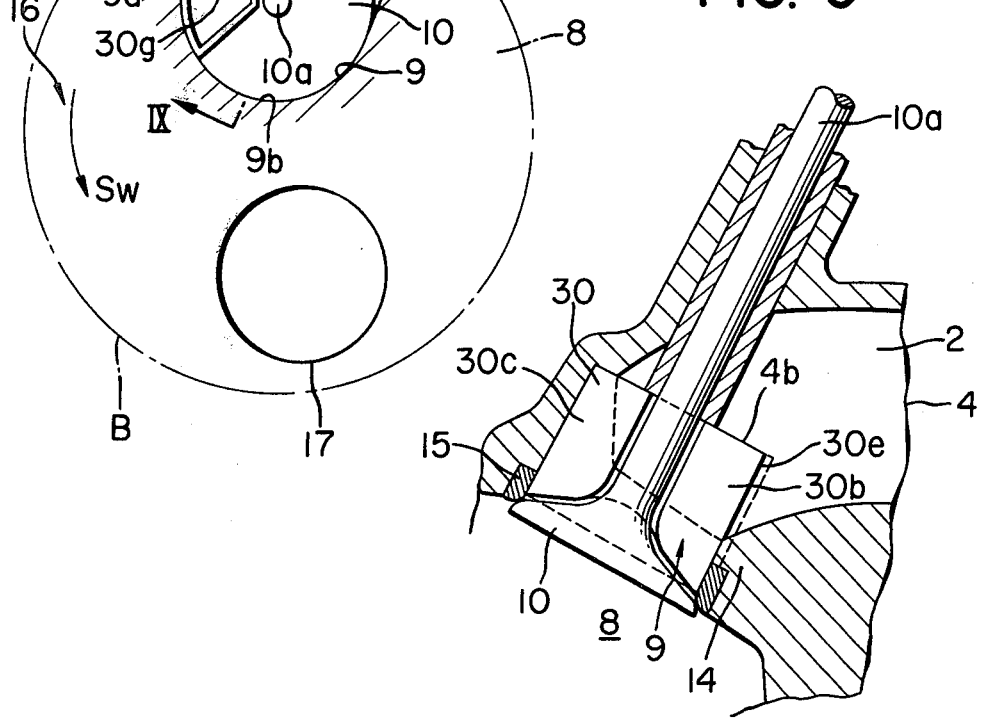
FIG. 9 is a sectional view taken along the line IX—IX in FIG. 8.

FIGS. 8 and 9 show an intake port arrangement employing the partition plate 30 shown in FIG. 7. As shown in FIG. 8, the partition plate 30 is positioned with the lip portion 30e in engagement with the adjacent end 4b of the separating wall 4 whereby the plate 30 is maintained against rotation. Further, the arcuate wall portion 30g is engaged by the valve seat ring 15 with a slight resilient radial deformation. Thus, the partition plate 30 can be firmly held in position.

Figure 10:
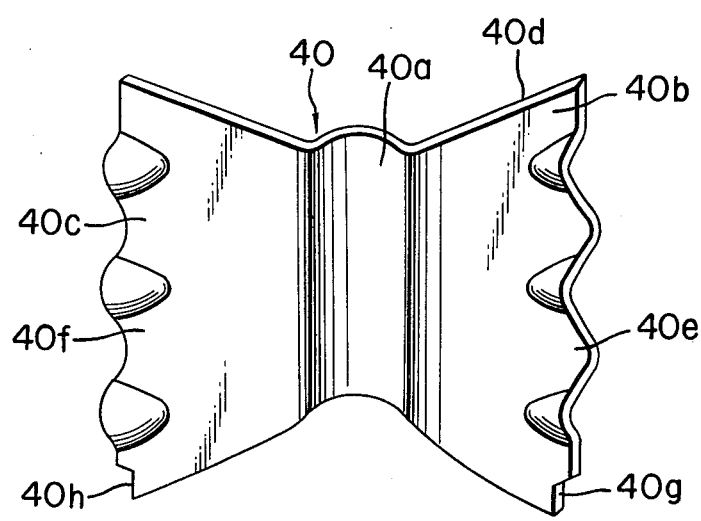
FIG. 10 is a perspective view showing a further embodiment of the present invention.

FIG. 10 is a further embodiment of the partition plate in accordance with the present invention. In this embodiment, the partition plate 40 has a central portion 40a of a semi-circular cross-section and a pair of wing portions 40b and 40c having upper edges 40d and side edges 40e and 40f. The lower portions of the side edges 40e and 40f are cut-off as shown by 40g and 40h. The side edges 40e and 40f have waved configurations as seen in FIG. 10. The partition plate 40 is adapted to be installed in a manner similar to that shown in FIG. 1 through 3 by inserting the waved side edges 40e and 40f into corresponding grooves in the intake port wall and the separating wall in the cylinder head. In this embodiment, since the side edges 40e and 40f are of waved configurations, the partition plate 40 can be firmly maintained in position without any play.

Figure 11:
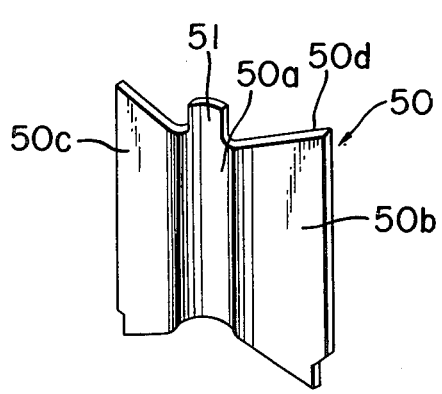
FIG. 11 is a perspective view of a partition plate in accordance with another embodiment of the present invention.
Figure 12:
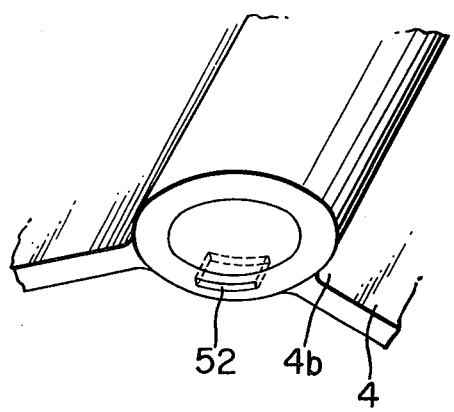
FIG. 12 is a fragmentary perspective view of a separating wall which is to be used with the partition plate shown in FIG. 11.

In the embodiment shown in FIGS. 11 and 12, the partition plate 50 is formed in a manner similar to the plate 12 shown in FIGS. 1 through 3 except that the plate 50 is provided with a projecting tongue 51 which may be formed as an extension of the central portion 50a. The separating wall 4 is formed at its end 4b with a slit 52 and the partition plate 50 is secured to the wall 4 by inserting the tongue 51 into the slit 52. It should of course be noted that various means may be adopted to secure the partition plate to the cylinder head. For example, the plate may be welded or bolted to the cylinder head.

Figure 13:
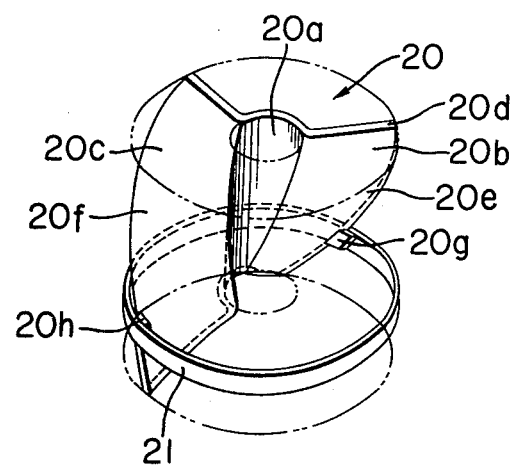
FIG. 13 is a perspective view of a partition plate in accordance with a further embodiment of the present invention.
Figure 14:
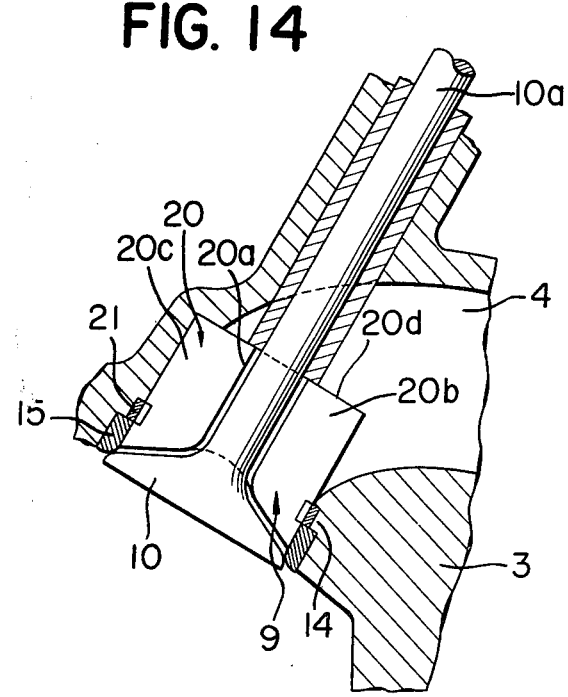
FIG. 14 is a sectional view showing the intake port arrangement including the partition plate shown in FIG. 13.

FIGS. 13 and 14 show a modification of the embodiment shown in FIGS. 4 through 6 and corresponding parts are shown by the same reference numerals. In this embodiment, the partition plate 20 is twisted in the direction of the expected swirl so that the swirl of mixture can further be intensified.

The invention has thus been shown and described with reference to specific embodiments, however, it should be noted that the invention is in no way limited to the details of the illustrated structures but changes and modifications may be made without departing from the scope of the appended claims.

We claim:

1. Internal combustion engine comprising cylinder means having cylinder bore means and piston means disposed in said cylinder bore means for reciprocating movement to define combustion chamber means in said cylinder means, intake port means provided in said cylinder means to open to said combustion chamber means, intake valve means provided at the intake port means, intake passage means including first and second intake passage means which communicate with said intake port means, said first and second intake passage means being separated by separating wall means formed integrally with said cylinder means, means for closing said second passage means at least under light load engine operation, partition plate means provided in said intake port means to extend in chordwise direction of the intake passage means whereby an extension of said separating wall means is provided so as to substantially isolate the first and second intake passage means one from the other when the intake valve means is closed, said plate means having ring member means which is secured in position by valve seat ring means attached to the intake port means to thereby fix the position of said plate means.

2. Internal combustion means in accordance with claim 1 in which said partition plate means has cut-out means for engagement with the valve seat ring means.

3. Internal combustion engine in accordance with claim 1 in which said partition plate means has arcuate wall means extending in circumferential direction, said arcuate wall means being resiliently deformable in radial direction and adapted to be engaged with inner peripheral surface of the valve seat ring means.

4. Internal combustion engine in accordance with claim 1 in which said partition plate means is of twisted configuration so as to intensify swirl of gas in the combustion chamber means.

5. Internal combustion engine in accordance with claim 1 in which said intake port means has a center and said first intake passage means has a centroid in a cross-section at the intake port means, a line passing through the center of the intake port means and the centroid of the cross-section of the first intake passage intersecting a projection of the cylinder bore means, a tangential line of the projection at the point of intersection making an angle with the first mentioned line, said angle being between 50° and 80°.

6. Internal combustion engine in accordance with claim 1 in which said partition plate means includes a central portion of a semi-circular cross-section adapted to be placed about stem means on said intake valve means and a pair of wing portions extending at the opposite sides of the central portion.

7. Internal combustion engine in, accordance with claim 6 in which said wing portions make an angle which is between 120° and 150°.

8. Internal combustion engine in accordance with claim 6 in which said partition plate means is inserted at the wing portions into corresponding grooves formed in the cylinder means.

9. Internal combustion engine in accordance with claim 6 in which said partition means is formed with at least one projection adapted to be engaged with corresponding slit formed in the cylinder means.

10. Internal combustion engine in accordance with claim 1 in which said partition plate means has an end which is adjacent and complementary in shape to said intake valve means and positioned with respect to the intake valve means such that a gap of 0.5 to 1.0 mm exists between the partition plate means and the intake valve means in the closed position thereof.

11. Internal combustion engine in accordance with claim 1 in which the cross-sectional area of said second passage means is larger than the cross-sectional area of said first passage means.

12. Internal combustion engine in accordance with claim 1 in which the partition plate means divides the intake port means into a first portion which communicates with the first intake passage means and a second portion which communicates with the second intake passage means, the second portion being larger than the first portion.

* * * * *